(12) United States Patent
Gugel

(10) Patent No.: US 9,463,522 B2
(45) Date of Patent: Oct. 11, 2016

(54) DRAWN ARC WELDING

(75) Inventor: Mark D. Gugel, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1117 days.

(21) Appl. No.: 13/440,198

(22) Filed: Apr. 5, 2012

(65) Prior Publication Data

US 2013/0263434 A1 Oct. 10, 2013

(51) Int. Cl.
*B23K 9/20* (2006.01)
*B23K 9/10* (2006.01)
*B23K 9/23* (2006.01)

(52) U.S. Cl.
CPC ............ *B23K 9/10* (2013.01); *B23K 9/202* (2013.01); *B23K 9/205* (2013.01); *B23K 9/23* (2013.01); *B23K 2201/185* (2013.01); *B23K 2203/04* (2013.01); *B23K 2203/18* (2013.01); *Y10T 29/49968* (2015.01)

(58) Field of Classification Search
CPC ........ B23K 9/20; B23K 9/205; B23K 9/201; B23K 9/202; B23K 9/1012; B23K 9/1043; B23K 9/1068; B23K 35/0288; F16B 37/061
USPC ................. 219/98, 99, 130.1, 130.5, 130.51; 411/171
See application file for complete search history.

(56) References Cited

U.S. PATENT DOCUMENTS

| | | | | |
|---|---|---|---|---|
| 2,115,707 A | * | 5/1938 | Crecca et al. | 219/98 |
| 2,307,026 A | * | 1/1943 | Crecca | 219/98 |
| 2,451,190 A | * | 10/1948 | Anderson | 219/98 |
| 2,843,727 A | * | 7/1958 | Benz, Jr. et al. | 219/137.42 |
| 2,878,363 A | * | 3/1959 | Shoup et al. | 219/99 |
| 2,898,443 A | * | 8/1959 | Havemeyer | 219/99 |
| 2,922,542 A | * | 1/1960 | Barr | 220/325 |
| 3,047,711 A | * | 7/1962 | Graham | 219/99 |
| 3,099,789 A | * | 7/1963 | Perrins | 361/58 |
| 3,182,172 A | * | 5/1965 | Dash | 219/98 |
| 3,249,735 A | * | 5/1966 | Needham | 219/130.51 |
| 3,435,325 A | * | 3/1969 | Arthur, Jr. | 322/15 |
| 3,530,359 A | * | 9/1970 | Franklin | 219/130.32 |
| 3,568,032 A | * | 3/1971 | Mages et al. | 363/3 |
| 3,569,663 A | * | 3/1971 | Weman | 219/127 |
| 3,588,465 A | * | 6/1971 | Anderson | 219/137 R |
| 3,637,971 A | * | 1/1972 | Needham et al. | 219/97 |
| 3,649,903 A | * | 3/1972 | Fiedler | 322/27 |
| 3,657,724 A | * | 4/1972 | Feeley et al. | 219/130.51 |
| 3,683,149 A | * | 8/1972 | Mages et al. | 219/137 R |
| 3,838,786 A | * | 10/1974 | Bachmann et al. | 219/98 |
| 3,894,210 A | * | 7/1975 | Smith et al. | 219/130.51 |

(Continued)

FOREIGN PATENT DOCUMENTS

JP 01273676 A * 11/1989 ............... B23K 9/20

*Primary Examiner* — David Angwin
*Assistant Examiner* — Jimmy Chou

(57) ABSTRACT

A drawn arc welding assembly and method for simultaneously welding a stud to a first workpiece and a second workpiece that are affixed together and have an electrically insulating joining layer between the workpieces. A pair of leads attach to the first workpiece and the second workpiece, with electrically opposite diodes connected between the leads and a power supply. The power supply also provides power to a stud. During welding, two arcs are simultaneously maintained between the stud and first workpiece and between the stud and second workpiece. The power supply may be chopped AC from a dual inverter power supply.

6 Claims, 1 Drawing Sheet

(56) References Cited

U.S. PATENT DOCUMENTS

| | | | | |
|---|---|---|---|---|
| 3,904,846 | A * | 9/1975 | Risberg | 219/130.33 |
| 4,044,223 | A * | 8/1977 | Paton et al. | 219/130.01 |
| 4,106,087 | A * | 8/1978 | Kawasaki | 363/70 |
| 4,129,770 | A * | 12/1978 | Gogolin et al. | 219/98 |
| 4,132,879 | A * | 1/1979 | Glorioso | 219/98 |
| 4,261,245 | A * | 4/1981 | Mauer | 411/43 |
| 4,398,080 | A * | 8/1983 | Johansson et al. | 219/130.1 |
| 4,417,120 | A * | 11/1983 | Lumbra et al. | 219/96 |
| 4,618,760 | A * | 10/1986 | Murch et al. | 219/130.4 |
| 4,797,529 | A * | 1/1989 | Schmitt et al. | 219/99 |
| 4,804,820 | A * | 2/1989 | Shoup | 219/98 |
| 4,806,735 | A * | 2/1989 | Ditschun et al. | 219/130.5 |
| 5,171,959 | A * | 12/1992 | Schmitt et al. | 219/99 |
| 5,281,791 | A * | 1/1994 | Tabata et al. | 219/130.51 |
| 5,349,152 | A * | 9/1994 | Renner | 219/99 |
| 5,393,164 | A * | 2/1995 | Renner et al. | 403/271 |
| 5,579,986 | A * | 12/1996 | Sherry et al. | 228/175 |
| 5,582,751 | A * | 12/1996 | Hagiwara et al. | 219/130.1 |
| 5,676,867 | A * | 10/1997 | Van Allen | 219/130.1 |
| 5,685,680 | A * | 11/1997 | Duffy et al. | 411/171 |
| 5,742,023 | A * | 4/1998 | Fortmann | 219/109 |
| 5,866,866 | A * | 2/1999 | Shimada | 219/110 |
| 5,938,945 | A * | 8/1999 | Hofmann et al. | 219/99 |
| 5,977,506 | A * | 11/1999 | von Daniken | 219/99 |
| 6,362,448 | B1 * | 3/2002 | Roser | 219/99 |
| 6,388,224 | B1 * | 5/2002 | Torvinen | 219/99 |
| 6,815,631 | B2 * | 11/2004 | Schmitt et al. | 219/99 |
| 7,009,144 | B2 * | 3/2006 | Schmidt et al. | 219/130.01 |
| 7,141,753 | B2 * | 11/2006 | Kondo et al. | 219/99 |
| 7,291,803 | B2 * | 11/2007 | Karakas | 219/110 |
| 8,242,410 | B2 * | 8/2012 | Peters | 219/130.51 |
| 8,410,400 | B2 * | 4/2013 | Fondriest | 219/137 WM |
| 8,502,106 | B2 * | 8/2013 | Ulrich et al. | 219/98 |
| 2004/0182828 | A1 * | 9/2004 | Schmidt et al. | 219/99 |
| 2005/0045608 | A1 * | 3/2005 | Sykes et al. | 219/130.5 |
| 2005/0056620 | A1 * | 3/2005 | Broehl | 219/98 |
| 2005/0161448 | A1 * | 7/2005 | Stava et al. | 219/130.21 |
| 2005/0252891 | A1 * | 11/2005 | Nakagami | 219/98 |
| 2007/0007255 | A1 * | 1/2007 | Mizoguchi | 219/99 |
| 2007/0056934 | A1 * | 3/2007 | Hsu | 219/98 |
| 2009/0084768 | A1 * | 4/2009 | Ohashi et al. | 219/130.4 |
| 2010/0170880 | A1 * | 7/2010 | Hsu et al. | 219/130.1 |
| 2010/0288735 | A1 * | 11/2010 | Schmitt et al. | 219/99 |
| 2010/0288736 | A1 * | 11/2010 | Miura | 219/99 |
| 2010/0301029 | A1 * | 12/2010 | Meckler et al. | 219/130.1 |
| 2010/0314371 | A1 * | 12/2010 | Davidson et al. | 219/130.1 |
| 2012/0175356 | A1 * | 7/2012 | Magerl et al. | 219/130.21 |
| 2013/0062327 | A1 * | 3/2013 | Hsu et al. | 219/130.1 |

\* cited by examiner

DRAWN ARC WELDING

BACKGROUND OF INVENTION

The present invention relates generally to drawn arc welding.

When work pieces, such as sheet metal are affixed together using an adhesive (forming a joint between the two work pieces), there may be situations where a repair is needed if a discrepancy may exist in the adhesive joint. To repair such a discrepancy, rivets or screws may be used to repair the joint. Others may have tried to bond a stud to one of the work pieces in an attempt to repair the joint, but this may not be as good of a repair as is desired.

SUMMARY OF INVENTION

An embodiment contemplates a drawn arc welding assembly for simultaneously welding a stud to a first workpiece and a second workpiece that are affixed together and have an electrically insulating joining layer between the workpieces, the first workpiece and joining layer having a cavity extending therethrough and partially through the second workpiece. The assembly may comprise an electric power supply; a first electrode from a first output of the electric power supply operatively engageable to the stud and configured to supply electrical power to the stud; a first lead configured to operatively engage the first workpiece; a second lead configured to operatively engage the second workpiece; a first diode, having a first electrical orientation, electrically connected between the first lead and a second output of the electric power supply; and a second diode, having a second electrical orientation opposite of the first diode, electrically connected between the second lead and the second output of the electric power supply.

An embodiment contemplates a method of drawn arc welding a stud simultaneously to a first workpiece and a second workpiece, with the first workpiece affixed to the second workpiece and with an electrically insulating joining layer between the first and second workpieces, the method comprising the steps of: boring a cavity through the first workpiece, the joining layer and only a portion of the second workpiece; connecting a first electrode from a first output of a power supply to the stud; connecting a first lead to the first workpiece, the first lead electrically connected via a first diode, having a first electrical orientation, to a second output of the power supply; connecting a second lead to the second workpiece, the second lead electrically connected via a second diode, having a second electrical orientation opposite to the first electrical orientation, to the second output of the power supply; pressing the stud into the cavity into contact with the first workpiece and the second workpiece; activating the power supply to apply a pilot arc; moving the stud away from the first and second workpieces to simultaneously form a first arc between the stud and the first workpiece and a second arc between the stud and the second workpiece; increasing the power output from the power supply so as to cause the surfaces of the first and second workpieces in the cavity to partially melt; and pressing the stud into the partially melted surfaces to thereby simultaneously weld the stud to the first workpiece and the second workpiece.

An advantage of an embodiment is that a joint between a pair of workpieces can be repaired by welding a single stud to both workpieces simultaneously. Two independently controlled parallel arcs between a single stud and two work pieces, created by a single DC or AC parallel circuit in the drawn arc welding assembly, allows for melting of all contact surfaces just prior to plunging and solidification. This allows for a good joint repair where the single stud is drawn arc welded to the two workpieces, separated by an insulating layer, simultaneously. Thus, this drawn arc welding method allows for simultaneous welding of a stud or other object to both pieces of laminated steel (with non-conductive lamination layer), or to both pieces of a layered build having sealer and/or adhesive between the sheets, thereby greatly increasing the joint strength and stiffness.

DETAILED DESCRIPTION

Figure 1:
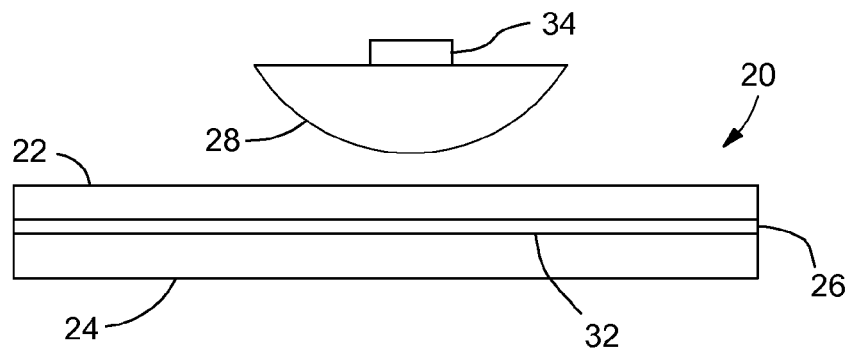
FIG. 1 is a schematic view of a portion of a system for creating a drawn arc weld between two workpieces.

Referring to FIG. 1, a workpiece assembly 20 includes an upper workpiece 22 and a lower workpiece 24. A joining layer 26 of adhesive and/or sealer 26 is located between and affixes the upper workpiece 22 to the lower workpiece 24, forming a joint 32 between them. The joining layer 26 provides some electrical insulating properties between the two workpieces 22, 24. The workpiece assembly 20 may also be made up of workpieces 22, 24 of laminated metal, such as steel with a non-conductive lamination layer forming the joining layer 26. The joining layer 26 provides electrical insulation sufficient to have a voltage drop greater than that of the same length of plasma. For example, if a welding arc of about one centimeter has about twelve volts, a joining layer of adhesive having a thickness of tens of microns would establish a voltage drop of about one-tenth of a volt to keep the arcs stable—one may instead employ a voltage drop through the joining layer 26 that is one or two orders of magnitude higher than this, if so desired.

A boring tool 34, which may have a semi-spherical head 28, is shown located adjacent to one of the workpieces (in this example, the upper workpiece 22) just prior to using the boring tool 34 to bore a cavity 30 (shown in FIG. 2) partially through the workpiece assembly 20. The boring tool 34 may be located where a discrepancy is believed to be in the joint 32.

A non-limiting example of the workpiece assembly 20 is two pieces of sheet metal that form a portion of a vehicle body that have been secured together with adhesive. Thus, while the terms "upper" and "lower" have been used herein, they are only for convenience in referring to the drawings and are not meant to be limiting as to the orientation in space of different portions of the workpiece assembly.

Figure 2:
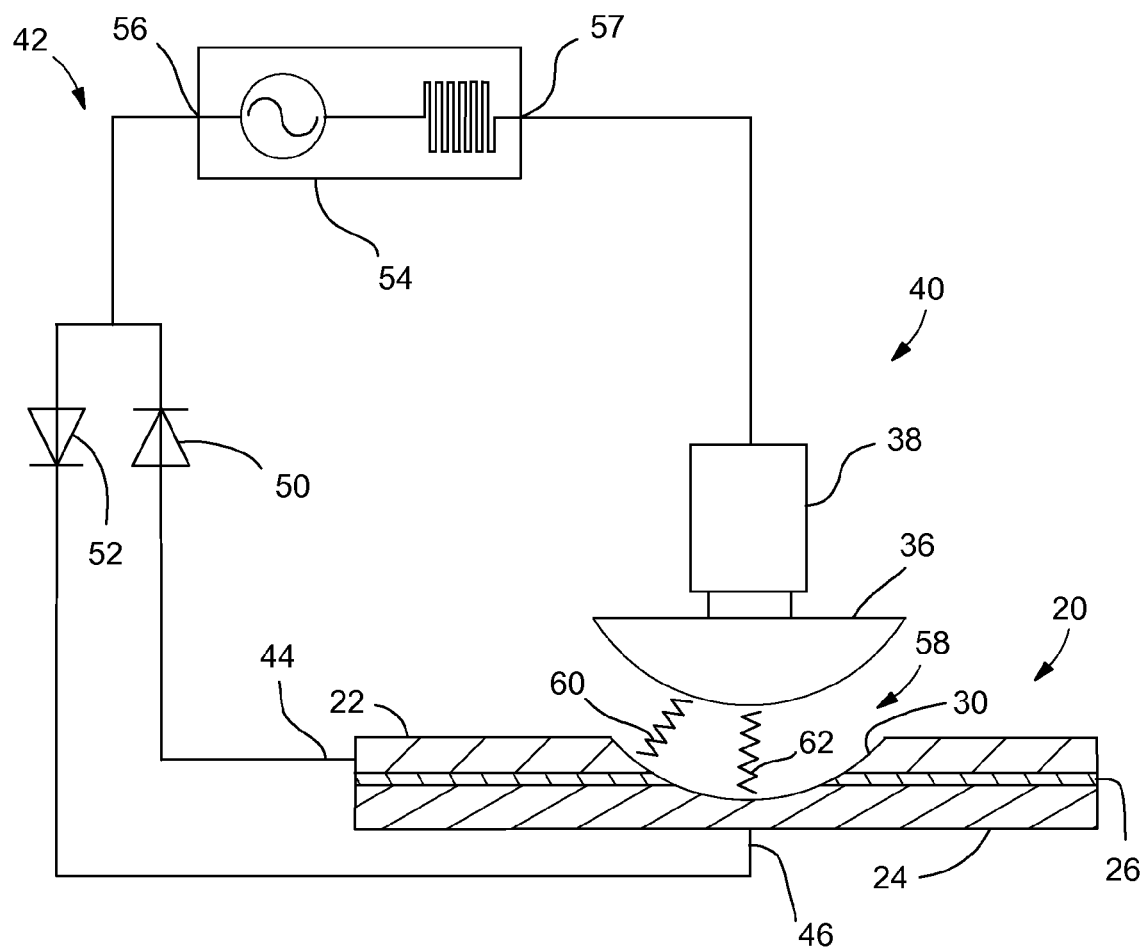
FIG. 2 is a schematic view of another portion of the system for creating the drawn arc welding between two workpieces.

Referring to FIG. 2, the workpiece assembly 20 is shown with the cavity 30 having been bored into it. The cavity 30 is deep enough that a portion of the joining layer 26 has been cleared away, allowing for contact of a stud 36 (that will act as a movable electrode) with both the upper workpiece 22 and the lower workpiece 24, but not deep enough that it extends all of the way through the workpiece assembly 20.

A drawn arc welding assembly 40 includes an electronic circuit 42 and a stud gun 38. The stud 36 may be supported and maneuvered by the stud gun 38, as the stud 36 is moved relative to the workpiece assembly 20 during welding operations. The stud gun 38 may also provide electric power to the stud 36 during the welding operation.

The electronic circuit 42 includes an upper workpiece lead (electrode) 44 connected to the upper workpiece 22 and a lower workpiece lead (electrode) 46 connected to the lower workpieces 24. The joining layer 26 has a small amount of conductivity and so acts as a relatively high resistance resistor between the leads 44, 46. The upper workpiece lead 44 connects at its opposite end from the upper workpiece 22 to an upper workpiece diode 50, having a first orientation, while the lower workpiece lead 46 connects at its opposite end from the lower workpiece 24 to a lower workpiece diode 52, having an electrical orientation opposite to that of the upper workpiece diode 50. The diodes 50, 52 are connected to a first connector 56 of a dual inverter power supply 54, which provides chopped AC current. The stud gun 38, and hence the stud 36, are connected to a second connector 57 of the power supply 54. While the current does not have to be chopped AC current, this may be the preferable current supply for the system.

The operation of the drawn arc welding assembly 40 will now be discussed relative to FIGS. 1 and 2. If a possible discrepancy in the joint 32 between the upper workpiece 22 and the lower workpiece 24 is detected, and a decision is made to repair the discrepancy, then a drawn arc welding process is conducted to repair the joint 32.

The boring tool 34 is used to create the cavity 30, which bores through the upper workpiece 22, the joining layer 26 and only a portion of the thickness of the lower workpiece 24. The stud 36 is loaded in the stud gun 38. The stud gun 38 directs the stud 36 into the cavity 30 in contact with the workpiece assembly 20. The dual inverter power supply 54 is activated so that two pilot arcs 60, 62 are applied. This pilot arc may be, for example, about 30 amperes. The stud gun 38 lifts the stud 36 so that it forms a gap 58, for example, of about 0.5 to 1.5 millimeters from the surfaces forming the cavity 30. The gap 58 shown in FIG. 2 is not to scale in order to allow for clarity in showing the elements of the system and its operation. The power output from the dual inverter power supply 54 is increased so that a welding amperage is now applied. This welding amperage may be, for example, in the range of about 300 to 900 amperes for a five millimeter steel headless stud, or 1,000 to 1,500 amperes for a six millimeter steel stud with thirteen millimeter head welds.

Having the two leads 44, 46 attached to different workpieces 22, 24 (acting as two separate stationary electrodes) with an insulating joining layer 26 between them, along with the oppositely oriented diodes 50, 52, allows for both a first arc 60 extending between the stud 36 (acting as a first movable electrode) and the upper workpiece 22 and second arc 62 extending between the stud 36 and the lower workpiece 24. In this case a dual inverter power supply 54 allows the current from one inverter to be conducted through one arc 60 and the current from the second inverter (or even the same inverter using the opposite polarity) to be pulsed to the second arc 62. By independently controlling the two arcs 60, 62, all three surfaces can be simultaneously melted. The independent control of the current of each arc is achieved by controlling the current of the chopped half cycles.

The arcs 60, 62 are maintained to melt the surfaces of the workpieces 22, 24. Once melted sufficiently, the stud gun 38 plunges the stud 36 into the molten surfaces, to secure the new welded assembly together. Plunging the stud 36 into the workpieces 22, 24 extinguishes the arcs and allows for immediate solidification. Power from the power supply 54 is cut, the stud gun 38 plunges the stud 36 into the workpiece 20 and the weld is complete. Thus, the stud 36 is welded to both the upper workpiece 22 and the lower workpiece 24 simultaneously, creating a strong joint between the two workpieces 22, 24 where there may have been a discrepancy in the joint 32 between the workpieces 22, 24.

While certain embodiments of the present invention have been described in detail, those familiar with the art to which this invention relates will recognize various alternative designs and embodiments for practicing the invention as defined by the following claims.

What is claimed is:

1. A method of drawn arc welding a stud simultaneously to a first workpiece and a second workpiece, with the first workpiece affixed to the second workpiece and with an electrically insulating joining layer between the first and second workpieces, the method comprising the steps of:
   (a) boring a cavity through the first workpiece, the joining layer and only a portion of the second workpiece;
   (b) connecting a first electrode from a first output of a power supply to the stud;
   (c) connecting a first lead to the first workpiece, the first lead electrically connected via a first diode, having a first electrical orientation, to a second output of the power supply;
   (d) connecting a second lead to the second workpiece, the second lead electrically connected via a second diode, having a second electrical orientation opposite to the first electrical orientation, to the second output of the power supply;
   (e) pressing the stud into the cavity into contact with the first workpiece and the second workpiece;
   (f) activating the power supply to apply a pilot arc;
   (g) moving the stud away from the first and second workpieces to simultaneously form a first arc between the stud and the first workpiece and a second arc between the stud and the second workpiece;
   (h) increasing the power output from the power supply so as to cause the surfaces of the first and second workpieces in the cavity to partially melt; and
   (i) pressing the stud into the partially melted surfaces to thereby simultaneously weld the stud to the first workpiece and the second workpiece.

2. The method of claim 1 wherein step (f) is further defined by the activating a chopped AC current from the power supply.

3. The method of claim 1 wherein step (b) is further defined by the stud being supported and moved by a stud gun and the power from the power supply transferring through the stud gun to the stud.

4. The method of claim 3 wherein step (e) is further defined by the stud gun moving the stud into the cavity.

5. The method of claim 1 wherein step (c) is further defined by the joining layer being a layer of adhesive securing the first workpiece to the second workpiece and the boring of the cavity bores through the adhesive layer.

6. The method of claim 1 including providing a resistor extending between the first lead and the second lead.

* * * * *